(12) United States Patent
Celik et al.

(10) Patent No.: US 7,695,553 B2
(45) Date of Patent: Apr. 13, 2010

(54) TWIN BLOWERS FOR GAS SEPARATION PLANTS

(75) Inventors: Cem E. Celik, Tonawanda, NY (US); James Smolarek, Boston, NY (US)

(73) Assignee: Praxair Technology, Inc., Danbury, CT (US)

( * ) Notice: Subject to any disclaimer, the term of this patent is extended or adjusted under 35 U.S.C. 154(b) by 882 days.

(21) Appl. No.: 11/477,908

(22) Filed: Jun. 30, 2006

(65) Prior Publication Data
US 2008/0000351 A1    Jan. 3, 2008

(51) Int. Cl.
*B01D 53/02* (2006.01)
(52) U.S. Cl. ............................................. 96/130; 415/1
(58) Field of Classification Search .................... 95/96, 95/148; 96/108, 130; 415/1; 55/470
See application file for complete search history.

(56) References Cited

U.S. PATENT DOCUMENTS

| | | | |
|---|---|---|---|
| 5,656,068 A | 8/1997 | Smolarek et al. | ............. 95/101 |
| 5,658,371 A | 8/1997 | Smolarek et al. | ............. 95/101 |
| 5,692,054 A | 11/1997 | Parrella | |
| 5,957,664 A * | 9/1999 | Stolz et al. | ................... 417/53 |
| 6,010,555 A | 1/2000 | Smolarek | |
| 6,428,282 B1 | 8/2002 | Langley | |
| 6,451,097 B1 | 9/2002 | Andreani et al. | ............. 96/380 |
| 7,282,873 B2 | 10/2007 | Abali et al. | |
| 2005/0237717 A1 | 10/2005 | Babb et al. | |

FOREIGN PATENT DOCUMENTS

| JP | 61261699 | | 11/1986 |
|---|---|---|---|
| JP | 05157094 | | 6/1993 |
| JP | 10122183 | A * | 5/1998 |
| JP | 2006272325 | A * | 10/2006 |

* cited by examiner

*Primary Examiner*—Robert A Hopkins
(74) *Attorney, Agent, or Firm*—Salvatore P. Pace

(57) ABSTRACT

The present invention relates to a method of reducing or elimination pressure pulsations and noise created by blowers in a gas separation plant. The method employs two identical and 180° out of phase blowers synchronized together to provide both a large flow of air and active noise cancellation to eliminate pressure pulsations. The two blowers are synchronized in such a way that pressure pulses created by one blower will actively be cancelled by the pulses generated by the other blower. At the same time, both blowers will work together to force a large quantity of gas flow in or out of the plant. The twin set of blowers can be used for feed or vacuum applications in the plant. This way large tonnage plant capital costs can be reduced by eliminating the need for an expensive silencer and a single large custom-made blower.

52 Claims, 8 Drawing Sheets

TWIN BLOWERS FOR GAS SEPARATION PLANTS

TECHNICAL FIELD

The present invention relates to canceling pressure pulsations and consequently induced noise during the operation of blowers of the type used in gas separation systems.

BACKGROUND OF THE INVENTION

Non-cryogenic gas separation processes, especially adsorptive processes, are used to separate various components from a gaseous mixture, e.g., oxygen from air. Pressure swing adsorption (PSA) processes, including superatmospheric adsorption/desorption processes, subatmospheric vacuum swing adsorption (VSA) and transatmospheric vacuum pressure swing adsorption (VPSA) processes have been used for decades for air separation and are well known in the art.

Conventional PSA, VSA and VPSA processes employ positive displacement blowers for either fluid feed into or exhaustion from the adsorbent vessel. Large tonnage gas separation plants, including VPSA plants, require high flow of gas in and out of adsorption beds. Commercially available off-the-shelf blowers cannot supply the required flow of air into the plant, and custom-made blowers in this size range become prohibitively expensive. In addition, larger blowers generate higher pressure pulses in the plant that might damage the equipment and lead to louder noise levels.

In VPSA plants, blowers displace a large quantity of gas from inlet on the intake side to outlet on the discharge side at relatively constant volume via pockets between the lobes of each blower and the housing. The flow of gas in and out of a blower is not steady, rather it is a discrete action. Due to pressure differences between the gas pockets and piping, every time the rotor tips clear the housing, it causes pressure fluctuations. Such fluctuations create pressure pulsations. These pulsations are a function of blower size and speed. Within the piping and plant equipment, these pulsations manifest themselves as vibrations, which shake the piping and plant equipment and can result in severe damage. In ambient air, these pulsations manifest as noise, which can be extremely loud. As the demand for higher throughput out of these plants increases, the size of the plant and the size of the blowers in the plant increase. However, larger blower sizes and higher rotation speeds create higher pulsations, which could be detrimental to plant equipment such as the aftercooler, beds and pipes, and may also generate higher noise levels. Generally, the most damaging pulsations are generated at low frequency. The primary frequency of the pulsations generated by the blowers is the lowest frequency in the frequency spectrum, which makes it extremely challenging to cancel these pulsations.

To minimize the impact of the pulsations, gas separation plants may utilize blower inlet and/or discharge silencers. However, such silencers become prohibitively expensive for larger plants, and they decrease plant efficiency by inducing pressure drop in the flow. Even though these silencers can reduce the pulsations and noise, nonetheless, the pulsation problem is still present and needs to be eliminated by some other means.

Prior attempts to solve the pulsation and noise problem include the installation of a Helmholtz-type pulsation dampener, also known as a Helmholtz resonator (U.S. Pat. No. 5,957,664), cylindrical metal shell discharge silencers (U.S. Pat. Nos. 5,957,664 and 5,658,371), and underground type concrete silencers (U.S. Pat. No. 6,451,097). In particular, cylindrical metal shell type silencers are widely used in the industry, but they are not very effective for use with high amplitude and low frequency pulsations. In order to improve their effectiveness, it has been suggested that cylindrical metal shell type silencers be used in conjunction with a Helmholtz resonator (U.S. Pat. No. 5,957,664). However, these resonators are only effective in cancelling pulsations at certain frequencies. These silencing methods are based on reactive and absorptive sound cancellation principles. The biggest hurdle in designing a large gas separation plant is that it requires a much higher flow rate which can only be achieved either by using a single larger than commercially available blower or two smaller off-the-shelf blowers simultaneously. U.S. Pat. No. 5,656,068 disclosed a four-bed VPSA process, operated as two pairs of 2-bed systems, referred to as 2×2 cycle/system, to produce oxygen from air. Each pair of beds is operated 180° out of phase and the two pairs of beds are operated out of phase by one-half of a half-cycle. Two compressors (one Roots or positive displacement and one centrifugal) and two vacuum pumps (one Roots or positive displacement and one centrifugal) are used and one of the two compressors is periodically in the idle or vent mode. Although the use of two relatively small blowers instead of one large blower has been disclosed in U.S. Pat. No. 5,656,068, the active noise cancellation concept is not taught or used.

U.S. patent application Ser. No. 11/395,140 disclosed another approach that employs a silencer for reducing noise level to about 90 dB level at the discharge of the vacuum blower in large tonnage oxygen VPSA plants. The silencer comprises reactive chambers to attenuate low frequency pulsations and absorptive chambers to attenuate medium to high frequency noise. Outer and interior walls of the silencer are made of concrete. Unlike steel-shelled silencers, the concrete silencer will not vibrate or act as a noise source. The low frequency noise is cancelled by expanding and contracting flow in series of reactive chambers that have multiple openings in the dividing walls. The absorptive chambers enforce a serpentine flow, and their entire interior walls are covered with sound absorbing material to effectively cancel noise at high frequencies. However, this approach still requires the use of a large custom-made blower or multiple blowers to provide a sufficient feed gas supply.

Thus, there is a continuing need for low cost and reliable solutions to prevent pulsation damage and reduce noise levels while providing high flow of gas in and out of the plant in a cost effective manner.

SUMMARY OF THE INVENTION

The present invention relates to a method of reducing or eliminating pressure pulsations and resulting noise created by blowers in a gas separation plant. More specifically, the present invention is directed to a method of canceling pressure pulsations from operating blowers in a gas separation plant comprising: (a) installing two identical blowers, each having an intake side and a discharge side; (b) connecting the first blower to a first conduit and the second blower to a second conduit; (c) positioning the first conduit and second conduit symmetrically; (d) merging the first conduit with the second conduit into a single merged conduit; and (e) synchronizing the first blower with the second blower, wherein the first blower generates pressure pulsations at a targeted frequency that are 180° out of phase with the pressure pulsations at the same targeted frequency generated by the second blower.

The method employs two identical blowers synchronized to generate 180° out of phase pressure pulsations. In this way, the blowers provide both a large flow of air and active cancellation of pressure pulsations. The two blowers are attached to a common shaft with a phase shift in such a way that pressure pulses created by one blower will actively be cancelled by the pulses generated by the other blower. At the same time, both blowers will work together to force a large quantity of gas flow in or out of the plant. The twin set of blowers can be used for feed or vacuum applications in the plant. This way large tonnage gas separation plant capital costs can be reduced by eliminating the need for an expensive silencer and a single large custom-made blower.

The known silencing methods are only effective at a certain frequency range. In this invention, twin blowers cancel the pressure pulsations at the primary frequency of the each blower at their source. Pulsations at higher harmonics of primary frequency may persist and may need to be cancelled using a conventional silencer. However, pressure pulsations at primary frequency of the blower have the most damaging energy and are harder to attenuate as compared to higher harmonics of this frequency. From this point of view, it is more efficient and economical to eliminate the low frequency pulsations in the plant immediately after they are generated using the twin blower concept described herein than to try to cancel them using silencers after they have already developed in the piping.

The present invention is also directed to a gas separation system comprising: (a) two identical blowers, each having an intake side and a discharge side; (b) a first conduit connected to the first blower and a second conduit connected to the second blower, where the first conduit and second conduit are positioned symmetrically; (c) a merged conduit into which the first conduit and the second conduit merge together; and (d) a mechanism which synchronizes the first blower with the second blower, wherein the first blower generates pressure pulsations at a targeted frequency that are 180° out of phase with the pressure pulsations at the same targeted frequency generated by the second blower.

The present invention is further directed to an apparatus for canceling pressure pulsations produced in a gas separation process wherein such apparatus simultaneously provides either feed gas or evacuates product gas, comprising: (a) two identical blowers, each having an intake side and a discharge side; (b) a first conduit connected to the first blower and a second conduit connected to the second blower, where the first conduit and second conduit are positioned symmetrically; (c) a merged conduit into which the first conduit and the second conduit merge together; and (d) a mechanism which synchronizes the first blower with the second blower, wherein the first blower generates pressure pulsations at a targeted frequency that are 180° out of phase with the pressure pulsations at the same targeted frequency generated by the second blower.

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION OF THE INVENTION

The present invention relates to a method of reducing or eliminating pressure pulsations and resulting noise generated by blowers in a gas separation plant. The term "pressure pulsations" may be used interchangeably with the terms "pressure pulses", "gas pulsations", "gas pulses", "pulsations" or "pulses". The method employs two identical or twin blowers synchronized to generate pulsations that are 180° out of phase. Twin blowers provide both a large flow of air and active cancellation of pressure pulsations at the primary frequency of the blowers. In one embodiment, the two blowers are tied to a common shaft with a phase shift in such a way that pressure pulses created by one blower will actively be cancelled by the pulses generated by the other blower. At the same time, both blowers will work together to force a large quantity of gas flow in or out of the plant. The twin set of blowers can be used for feed or vacuum applications in the plant. In this way, capital costs of a gas separation plant can be reduced by eliminating the need for one or more expensive silencers and a single large custom-made blower.

Figure 1:
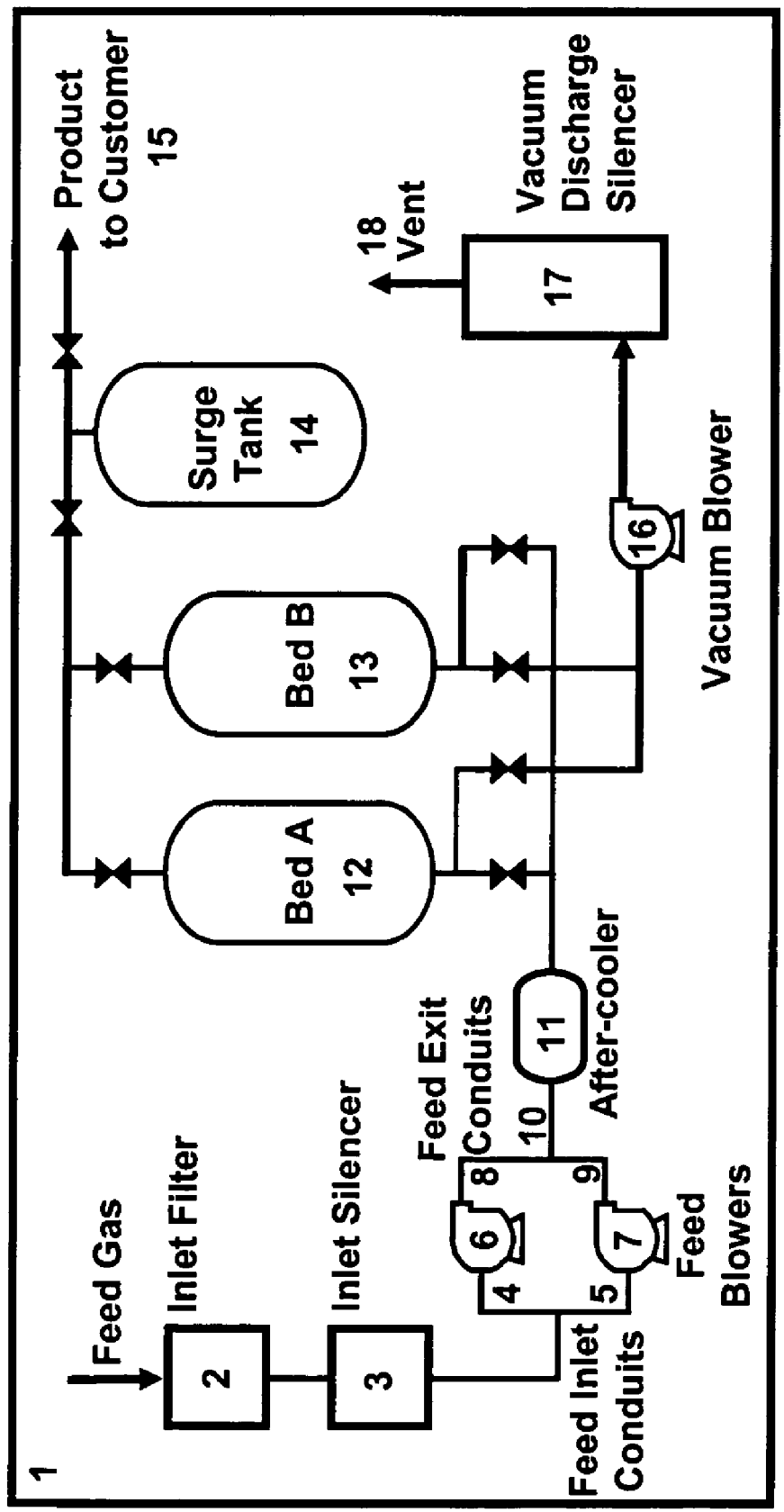
FIG. 1 is a schematic of the layout of a VPSA Plant.

FIG. 1 shows the layout of a VPSA plant (1). In this particular plant layout, the twin blowers are feed blowers, but the same concept can equally be applied to vacuum blowers. During the feed step, feed gas enters into the plant through inlet filter (2) and inlet silencer (3). Silenced feed gas is supplied to two feed blowers (6, 7) through feed inlet conduits (4, 5). Each feed blower discharges the feed gas to its respective conduit (8, 9) and after which the merged flow (10) is cooled in an after-cooler (11) before entering into one of the adsorbent beds (12, 13) where one or more components of the gas is adsorbed and the remaining product gas component is discharged to a surge tank (14) through which it is delivered to the customer (15). While one of the adsorbent beds is going through the feed (adsorption) step, the other bed is regenerated with a vacuum (desorption) step, during which rejected gas is vacuumed out of the adsorption beds through vacuum blower (16) and silenced in the vacuum discharge silencer (17) before vent (18) out to atmosphere. The concept of vacuum pressure swing adsorption (VPSA) cycle and plant are described in U.S. Pat. No. 6,010,555 in more detail. FIG. 1 illustrates a two-bed plant, but the present invention is also effective in plants having more than two beds. For the purposes of this invention, the term "conduit" shall be interchangeably used with the terms "pipe" or "piping".

Figure 2:
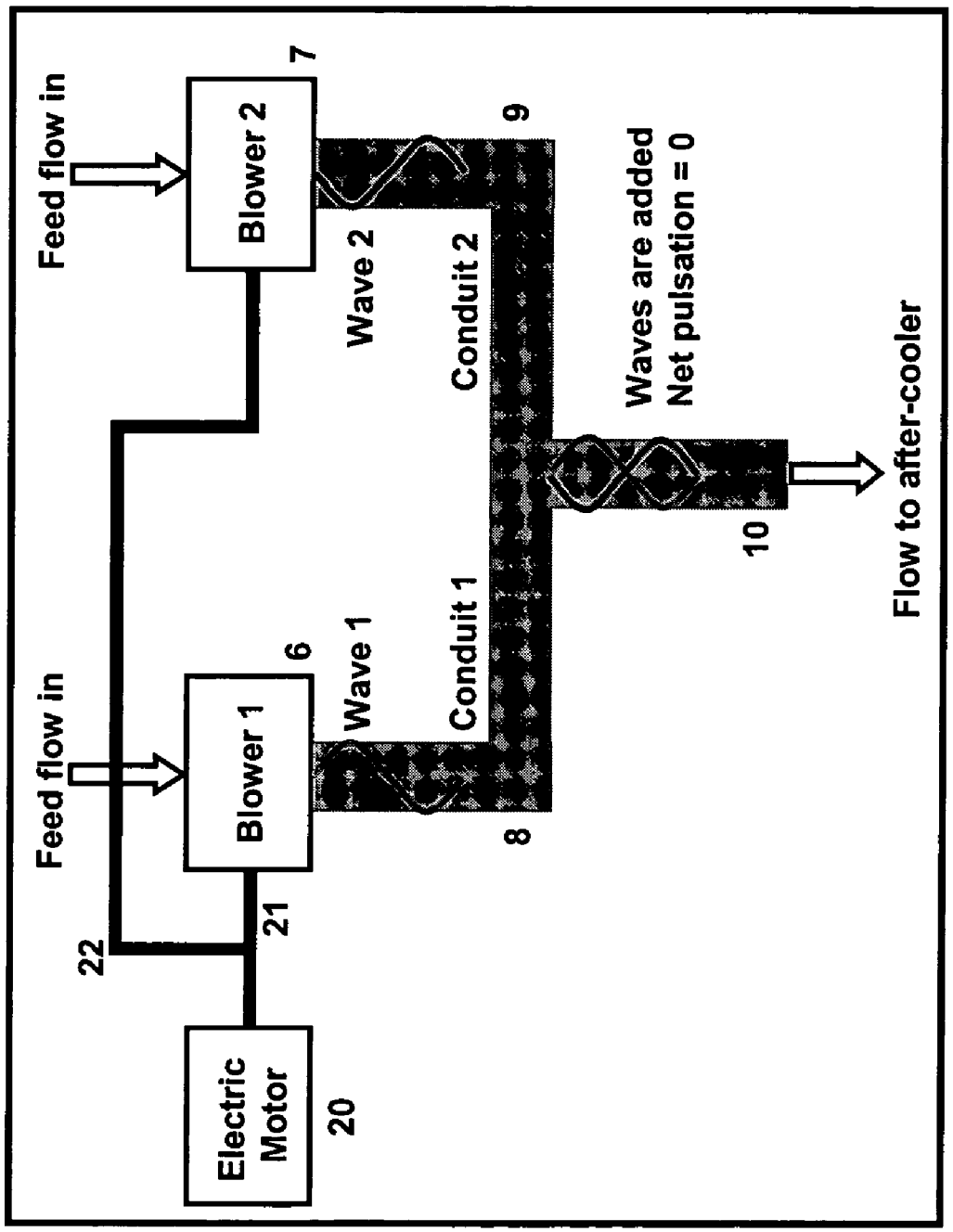
FIG. 2 is a schematic of the twin-blower system and cancellation of pressure pulsations.

To reduce unwanted pulsations in the plant, this invention uses a twin set of blowers to actively cancel pressure pulsations generated by one blower with pulsations generated by the other blower. The present invention is applicable to conventional off-the-shelf blowers of any size. FIG. 2 focuses on the twin feed blowers and their piping in the VPSA plant. Conduits (8, 9) of the first blower (6) and the second blower (7) are merged to a single conduit (10) and both blowers work together to force large quantities of gas into the plant. In one embodiment, blowers are actuated by the same electric motor (20), while one of the blowers is directly connected to the shaft (21) of the electric motor and the other one is actuated through a timing belt (22) attached to this shaft. A timing belt ensures a constant phase shift between blowers in such a way that generated pulses from the blowers are completely reversed (i.e., 180° out of phase). Other methods of creating a constant phase shift include, but are not limited to, mechanisms such as gears or chains. As gas forced by each blower flows through their respective exit conduits (8, 9), pressure pulsation waves develop in these conduits. The pulsations from each blower interfere and eventually cancel each other when two blower exit conduits merge (10). This is the underlying concept of active pulsation cancellation and it is applicable to any blower size and speed. FIG. 2 illustrates the piping on the discharge side of the twin blowers, but the present invention is also directed to the piping on the intake side of the blowers. The conduits on either or both the intake and discharge sides of the blowers may be symmetrically placed to achieve active pulsation cancellation. In other embodiments, the first blower may be indirectly connected to the second blower. For example, each blower may be directly connected to a separate motor, and the motors are linked and timed to rotate the blowers at the appropriate phase shift.

The present invention is directed to a method of canceling pressure pulsations from operating blowers in a gas separation plant comprising: (a) installing two identical blowers, each having an intake side and a discharge side; (b) connecting the first blower to a first conduit and the second blower to a second conduit; (c) positioning the first conduit and second conduit symmetrically; (d) merging the first conduit with the second conduit into a single merged conduit; and (e) synchronizing the first blower with the second blower, wherein the first blower generates pressure pulsations at a targeted frequency that are 180° out of phase with the pressure pulsations at the same targeted frequency generated by the second blower. The present invention contemplates canceling pressure pulsations at a particular targeted frequency that can be selected based on the length of the first and second conduits. Generally, the targeted frequency will be at the primary frequency of the pulsations generated by the blowers.

The present invention is also directed to a gas separation system comprising: (a) two identical blowers, each having an intake side and a discharge side; (b) a first conduit connected to the first blower and a second conduit connected to the second blower, where the first conduit and second conduit are positioned symmetrically; (c) a merged conduit into which the first conduit and the second conduit merge together; and (d) a mechanism which synchronizes the first blower with the second blower, wherein the first blower generates pressure pulsations at a targeted frequency that are 180° out of phase with the pressure pulsations at the same targeted frequency generated by the second blower.

The present invention is further directed to an apparatus for canceling pressure pulsations produced in a gas separation process wherein such apparatus simultaneously provides either feed gas or evacuates product gas, comprising: (a) two identical blowers, each having an intake side and a discharge side; (b) a first conduit connected to the first blower and a second conduit connected to the second blower, where the first conduit and second conduit are positioned symmetrically; (c) a merged conduit into which the first conduit and the second conduit merge together; and (d) a mechanism which synchronizes the first blower with the second blower, wherein the first blower generates pressure pulsations at a targeted frequency that are 180° out of phase with the pressure pulsations at the same targeted frequency generated by the second blower.

Example 1

Theoretical Analysis

Figure 3:
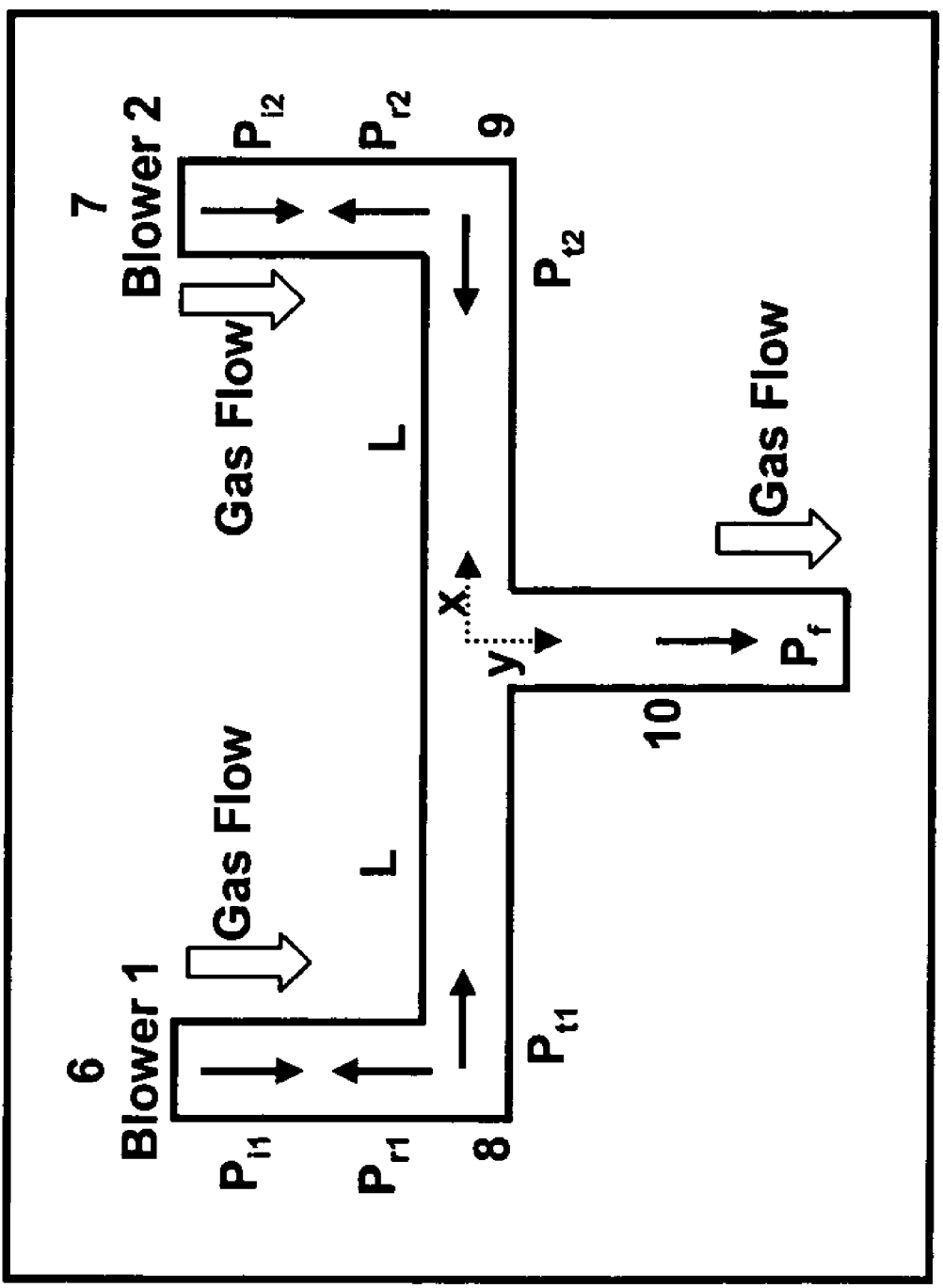
FIG. 3 is an illustration showing pressure fields in the blower piping.

Pressure fields in the blower exit conduits (8, 9) are identified as shown in FIG. 3. The analysis showed that if the exit piping geometry is symmetric and the waves are completely out of phase, the pressure pulses in the merged exit piping (10) are completely diminished. In the analysis, the origin x=y=0 (where x is the horizontal axis measuring the horizontal leg of the exit conduit of each blower and y is the perpendicular axis measuring the length of the merged exit conduit) is located where the two exit conduits (8, 9) meet, and distance from the 90° turn to the origin is set to L on each side.

The analysis is as follows:

Pressure pulsations in the exit conduit (8) of the first blower (6) are due to pulses generated by the first blower. The pressure field in this conduit has two components, namely incident pressure $P_{i1}$ and its reflection $P_{r1}$, these pressure components are defined as:

$$P_{i1}=A_1 \cdot e^{iky} \text{ and } P_{r1}=B_1 \cdot e^{-iky} \qquad \text{(Equation 1)}$$

where $A_1$ and $B_1$ are the amplitude of pressure pulsations and k is the wave number and is defined as:

$$k = \frac{2\pi}{\lambda} = 2\pi\frac{f}{c} \qquad \text{(Equation 2)}$$

where c is the wave speed, and $\lambda$ and f are the wavelength and frequency of the pulsations, respectively.

Similarly, incident and reflected pressures in the exit conduit (9) of the second blower (7) are defined as:

$$P_{i2}=A_2 \cdot e^{iky} \text{ and } P_{r2}=B_2 \cdot e^{-iky} \qquad \text{(Equation 3)}$$

where $A_2$ and $B_2$ are the amplitude of pressure pulsations.

The transmitted portion of the incident pressure waves after the 90° turns in the exit conduits (8, 9) on each side can be expressed as $$P_{t1}=C_1 \cdot e^{ik(x+L)} \text{ and } P_{t2}=C_2 \cdot e^{-ik(x-L)} \qquad \text{(Equation 4)}$$

where $C_1$ and $C_2$ are the amplitude of pressure pulsations.

Using Equations 1, 2 and 3, the pressure at both turning points in the exit conduits is expressed as:

$$\text{at } x=-L \text{ and } y=0, P_{i1}+P_{r1}=P_{t1}+P_{t2} \Rightarrow A_1+B_1=C_1+C_2 \cdot e^{2ikL} \qquad \text{(Equation 5)}$$

$$\text{at } x=L \text{ and } y=0, P_{i2}+P_{r2}=P_{t2}+P_{t1} \Rightarrow A_2+B_2=C_2+C_1 \cdot =C_2 C_1 \cdot e^{2ikL} \qquad \text{(Equation 6)}$$

Also using Equation 3, pressure in the horizontal pipe can be expressed as:

$$P = P_{t1} + P_{t2} = C_1 \cdot e^{ik(x+L)} + C_2 \cdot e^{-ik(x-L)} \quad \text{(Equation 7)}$$

At x=0 and y=0, where the two exit conduits merge, Equation 6 reduces to:

$$P = (C_1 + C_2) \cdot e^{ikL} \quad \text{(Equation 8)}$$

Combining Equations 4 and 5 and then factoring the common terms will yield:

$$C_1 + C_2 = \frac{A_1 + B_1 + A_2 + B_2}{1 + e^{2ikL}} \quad \text{(Equation 9)}$$

Since the waves are completely out of phase, then $$A_1 = -A_2 \text{ and } B_1 = -B_2 \quad \text{(Equation 10)}$$

If Equation 10 is plugged into Equation 9, $C_1+C_2$ reduces to zero, then pressure equation (Equation 8) also goes to zero at the point where two pipes are merged. Therefore the pressure in the merged exit piping (10) $P_f$ will be equal to zero at all times. This is because the pipe dimensions on each branch is identical and the pressure pulsations in conduits (8, 9) are 180° out of phase.

Example 2

Validation

A finite element analysis of blower pipe exit conduit was performed using commercial finite element code ANSYS 5.7. As shown in FIG. 3, only exit piping from the two blowers to inlet of after-cooler is modeled. Pressure fields inside the exit conduits are investigated for various geometries and pulsation frequencies from 10 Hz to 500 Hz. Corresponding wavelengths of this frequency span are in the range of 2 ft to 125 ft for the temperature ranges of interest, i.e., 70° F. to 300° F. and wave speed in air. It is also important to note that in a typical VPSA plant, the pulsation frequency is most likely in the range of 40 Hz to 100 Hz, but it could be as high as 250 Hz. From this point of view, typical pulsation frequencies comfortably fall into the frequency range used in the simulations. In the model, the effect of the blower is entered as pressure boundary and the shape of the pressure profile is assumed to be sinusoidal. In addition, due to axisymmetric nature of the pipe geometry, only a 2-dimensional model was developed to save computational time and effort.

In the simulations, the blower exit pipes were 12 inches in diameter, "L"-shaped (i.e., having a 90° bend) and 5 feet in length on each side of the "L" before merging with each other. In the simulations, different conduit lengths were tested for the piping connection from blower discharge to the point both pipes merge. It is observed that there is no effect of pipe length on the pulsation levels of the final merged pipe as the pulsations are always cancelled by each other after the pipes are merged as long as the conduits are symmetric and the pressure pulsations are 180° out of phase. Similarly, simulations performed with different excitation frequencies (i.e., different wavelengths) yielded cancelled waves in the merged pipe when the conditions stated above were satisfied. However, the level of pulsations in the conduits before they merge depends on pipe length and excitation frequency. To prevent excessive pressure pulses from developing in the conduits, pipe lengths should be carefully selected, so that the frequency of pressure pulsations does not coincide with acoustic resonance of the pipe and put the pipe into resonance. The length of the conduits should not be equal to any integer multiples of quarter-wavelength for the primary pulsation frequency or its higher harmonics in order to prevent quarter-wavelength resonances from developing in the conduits before the waves interfere with each other.

Figure 4:
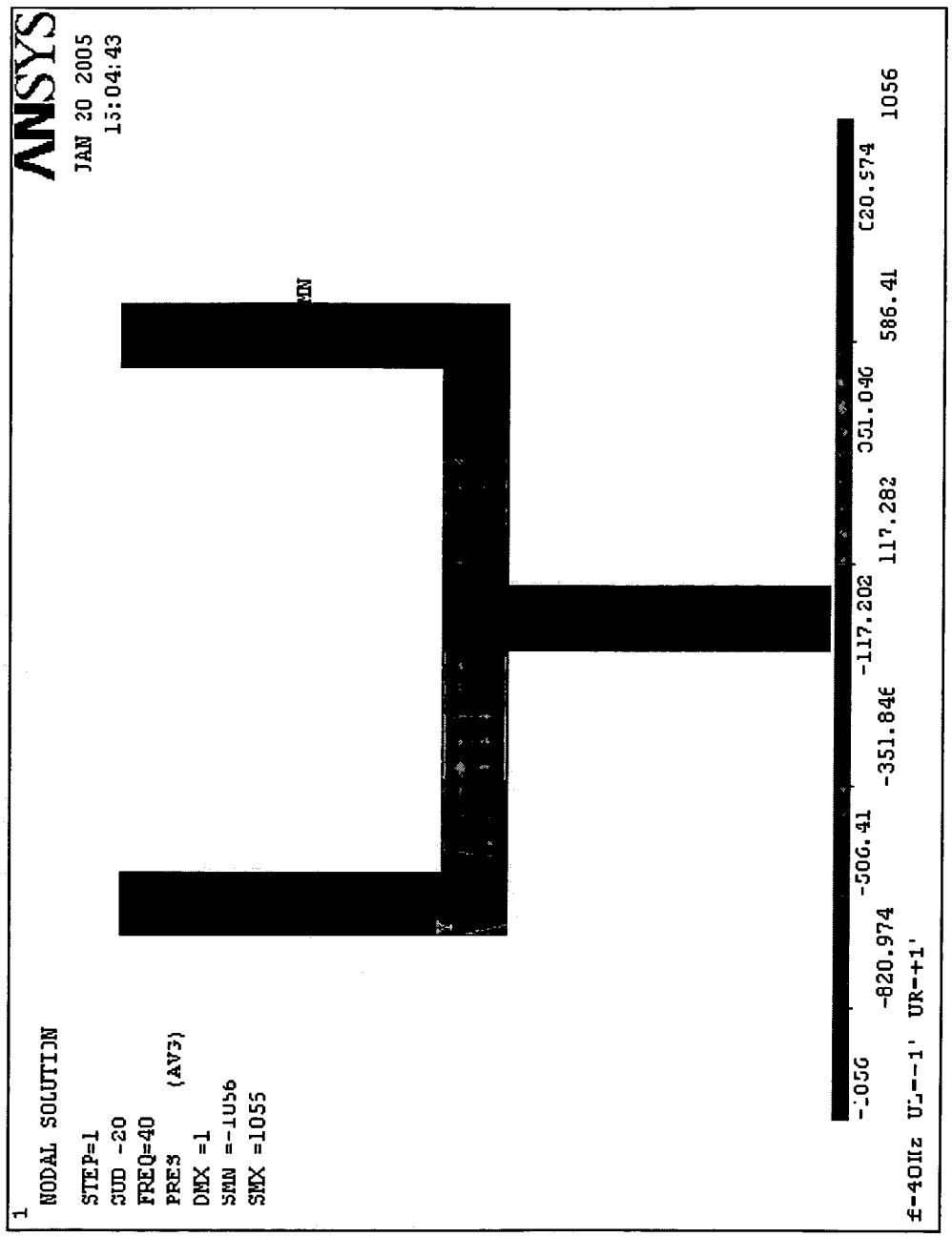
FIG. 4 is an illustration showing cancellation of pressure pulsations as shown in the simulation results, where the piping geometry is symmetrical and the generated pressure pulsations are 180° out of phase. No pulsations are present in the piping after the blower conduits are merged.
Figure 5:
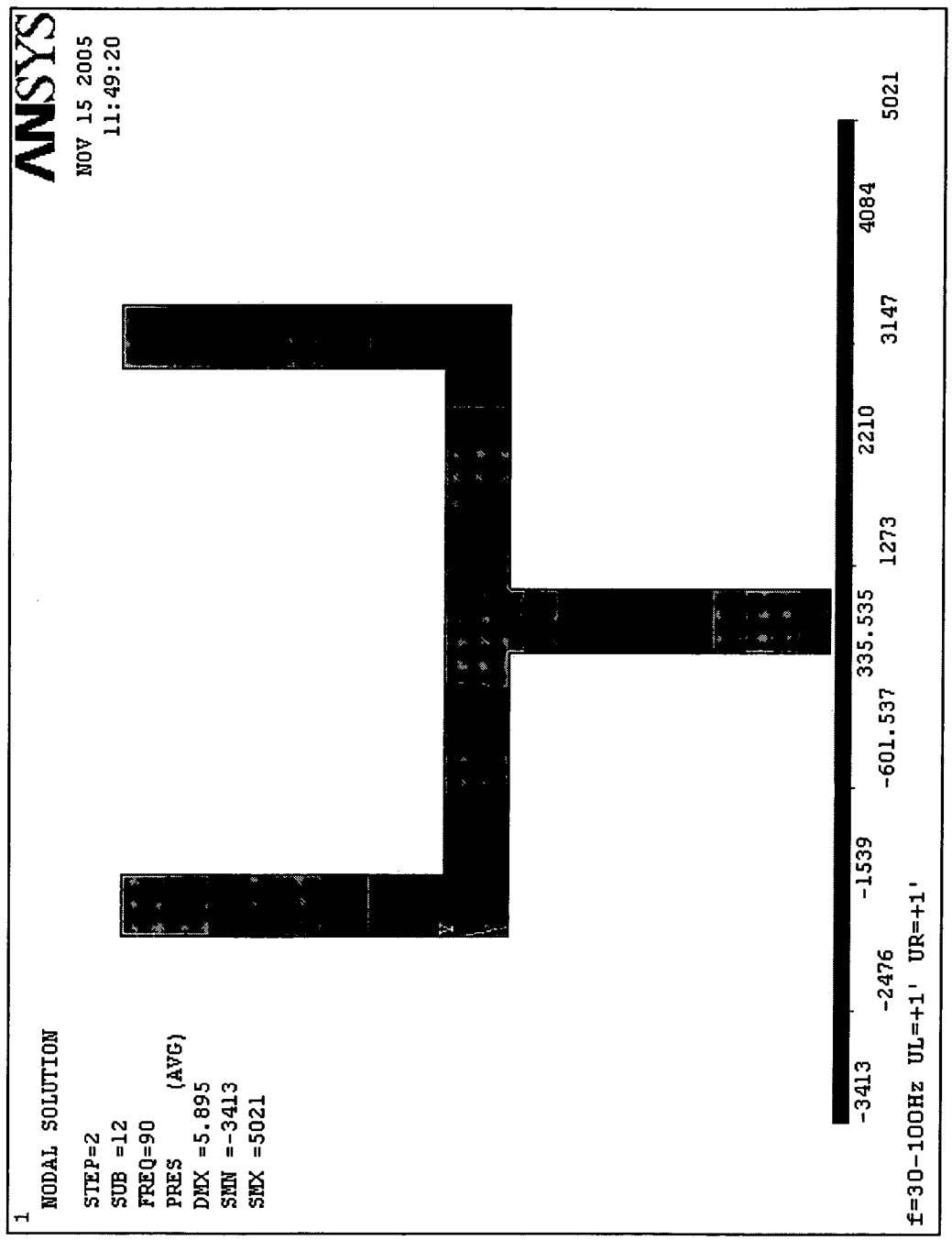
FIG. 5 is an illustration showing that the pressure pulsations are not cancelled when the pulsations are not completely out of phase and the piping geometry is symmetrical. Pulsations are present in the piping after the blower conduits are merged.
Figure 6:
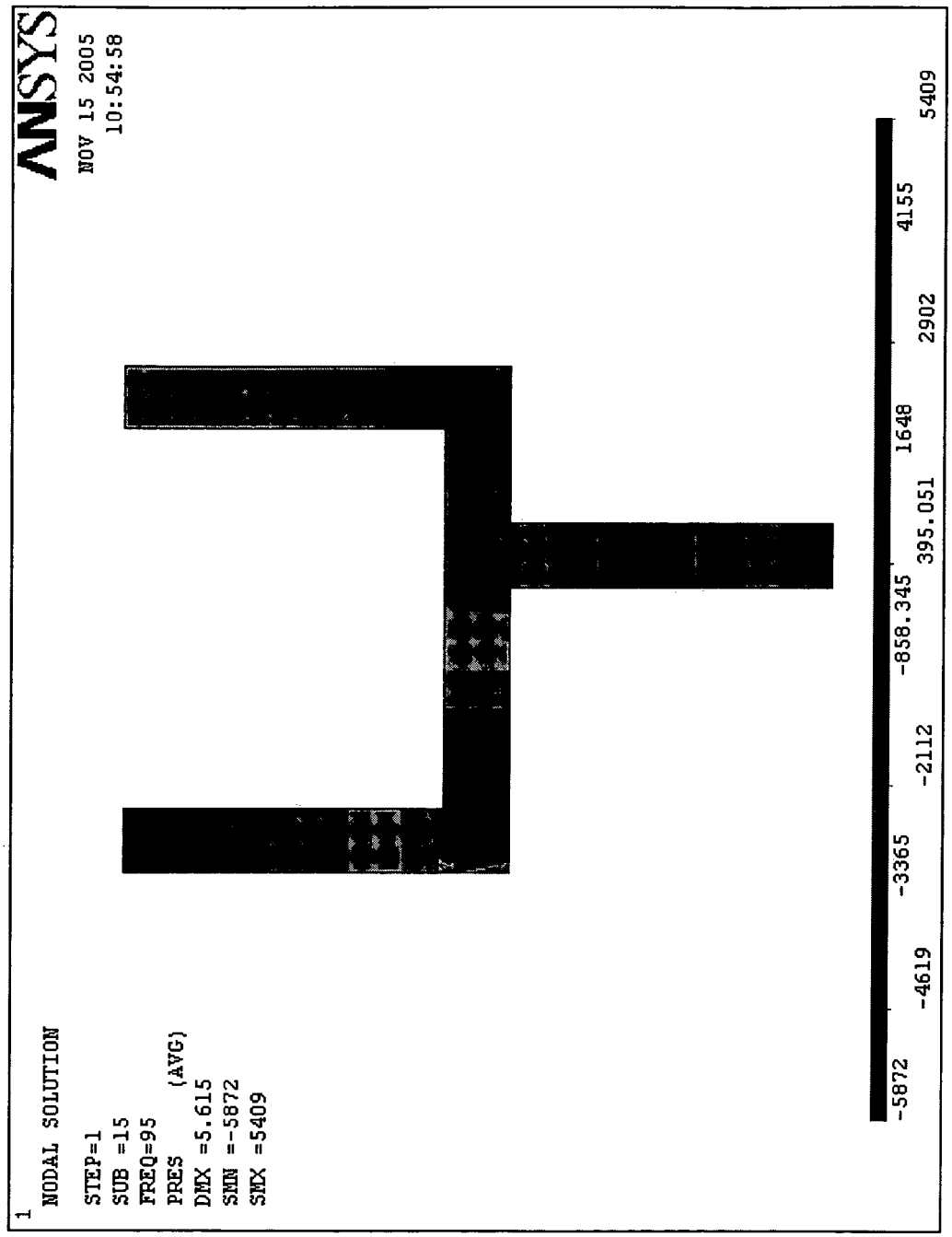
FIG. 6 is an illustration showing out of phase pulsations are not cancelled when the piping is asymmetrical. Pulsations are present in the exit piping after the blower exit conduits are merged.

As the conduits merge with each other, the pulses generated by the first blower interfere with the pulses generated by the second blower and eventually the pulses cancel each other if the symmetry and 180° out of phase pressure conditions are met, as shown in FIG. 4. Canceling of pressure pulsations with pressure pulsations from another source is a successful means of reducing such pulsations, particularly at low frequencies. It is important to maintain the symmetry of the piping so that when the pulsations from the first blower interfere with the pulsations from the second blower, the two sets of pulsations are completely (i.e., 180°) out of phase and they cancel each other out. If the pressure pulses are not completely out of phase as shown in FIG. 5, or the piping configuration is not totally symmetric as shown in FIG. 6, simulations show that pressure pulsations are not cancelled at the merged conduit. For these reasons, the key factor for effective pulsation cancellation is to have an all-around symmetric unit, in which the blowers and piping must be identical in dimension, geometry and material properties.

Example 3

Flow Characteristics

Figure 7:
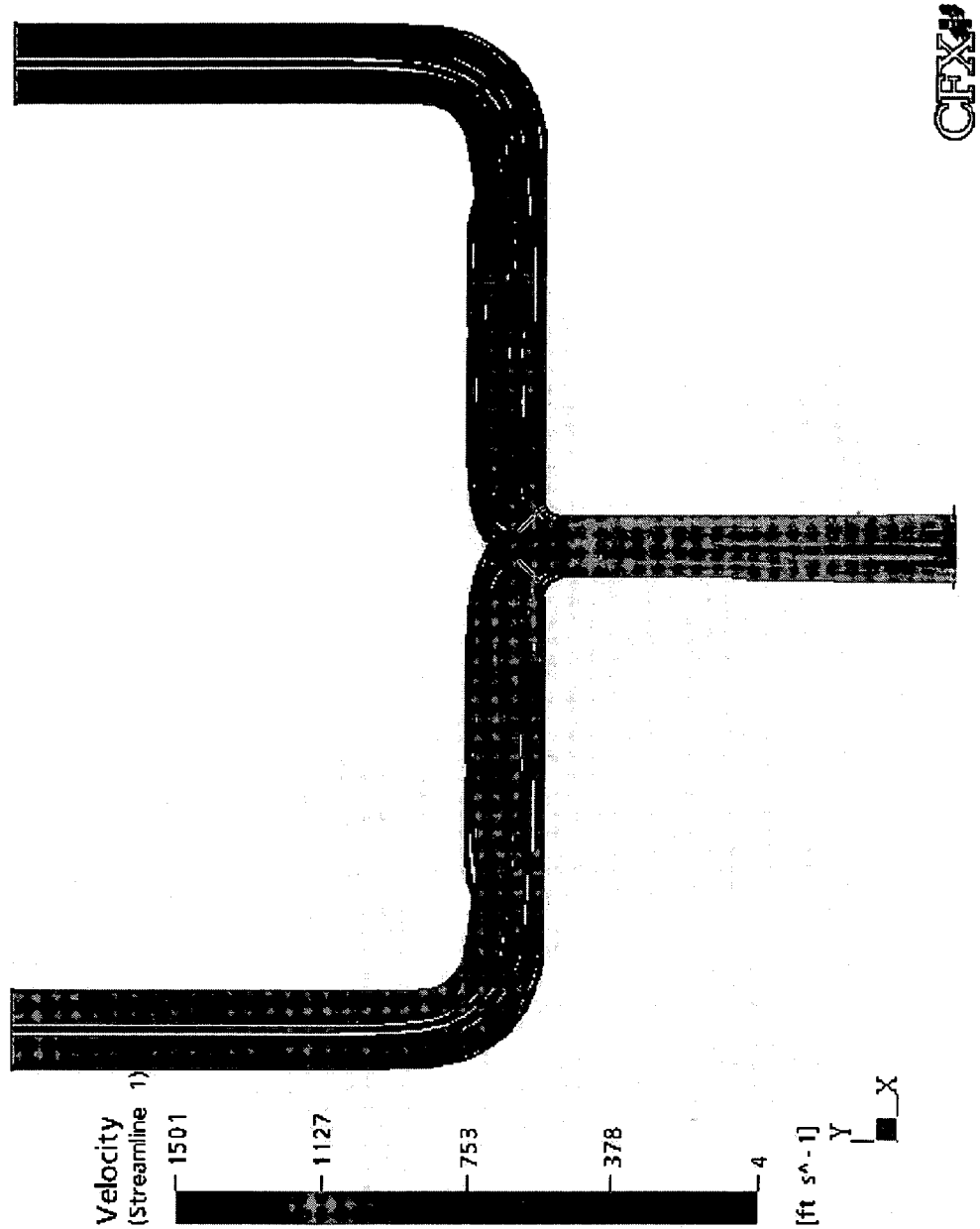
FIG. 7 is an illustration showing computational fluid dynamics (CFD) simulation results confirming flows coming from each blower successfully merging into the merged piping for the given volumetric flow.

It is also important to investigate the flow characteristics of the exit conduits as the flow mechanics are completely different than the wave mechanics in the piping. Directing the opposing waves to each other can effectively cancel them but from a fluid mechanics point of view, directing two flows straight to each other may result in vortex formation and higher pressure drop in the piping. For this reason a computational fluid dynamics simulation of the pipe circuit was performed using commercial computational fluid dynamics software ANSYS/CFX. In this model, the same pipe length and diameter are used as in the wave model and simulations. Each blower was assumed to provide an extremely high flow rate of 40,000 scfm of air for a 12-inch diameter pipe. The flow rate was intentionally selected to be high to investigate the flow field under very high flows. FIG. 7 illustrates the effective and homogenous mixing of the flow from the two conduits without forming a vortex at these extreme flow cases, therefore, there should be no flow issues at these or any lower velocities.

The invention described herein is discussed in the context of feed blowers. However, the twin blower concept is equally applicable for vacuum applications. In fact, it is more crucial to use twin blowers in a vacuum application since the largest amount of gas per unit time is displaced during the vacuum step. The need for a larger blower and silencing the corresponding higher pulses are amplified during the vacuum step.

Positive displacement rotary compressors can be divided into following groups: (a) straight lobe, including 2-lobe and 3-lobe; (b) screw (helical) compressors, including 3+4 and 4+6; (c) sliding vane compressors, including 6, 8, or 10 vane or even higher numbers can be used. The present invention can work with any type of blower with any number of blower lobes as long as both blowers have the same number of lobes. Having the same internal geometry and same number of lobes in each of the twin blowers will guarantee that the pulses generated by the first blower will be identical to pulses generated by the second blower. For the case of two-lobe blowers, by geometry, there are four pockets in the blower. In one full 360° rotation of the drive shaft, four pockets are discharged by the blower, and hence four pressure pulses are generated for one full rotation of the drive shaft. Therefore, pressure pulsations complete on full cycle for every 90° rotation of the drive shaft. For this reason, to generate completely out of phase pulsations, two-lobe blowers should be 45° out of phase. Similarly, in the case of three-lobe blowers, there are six pockets in the blower. In one full rotation of the drive shaft, six pockets are discharged by the blower, and hence six pressure pulses are generated by one full rotation of the drive shaft. Therefore, pressure pulsations complete one full cycle for every 60° rotation of the drive shaft. For this reason, to generate completely out of phase pressure pulsations, the blowers should be operated 30° out of phase to cancel pulsations. As an example, for a typical 900 rpm motor speed in a VPSA plant, the frequency of drive shaft rotation is 15 Hz (900 rpm). A two-lobe blower generates pulsations at four times the frequency of the drive shaft and a three-lobe blower generates pulsations at six times the frequency of the drive shaft. Thus, a two-lobe blower operating at 900 rpm will generate pressure pulsations at a primary frequency of 60 Hz, and a three-lobe blower operating at 900 rpm will generate pressure pulsations at a primary frequency of 90 Hz.

Figure 8:
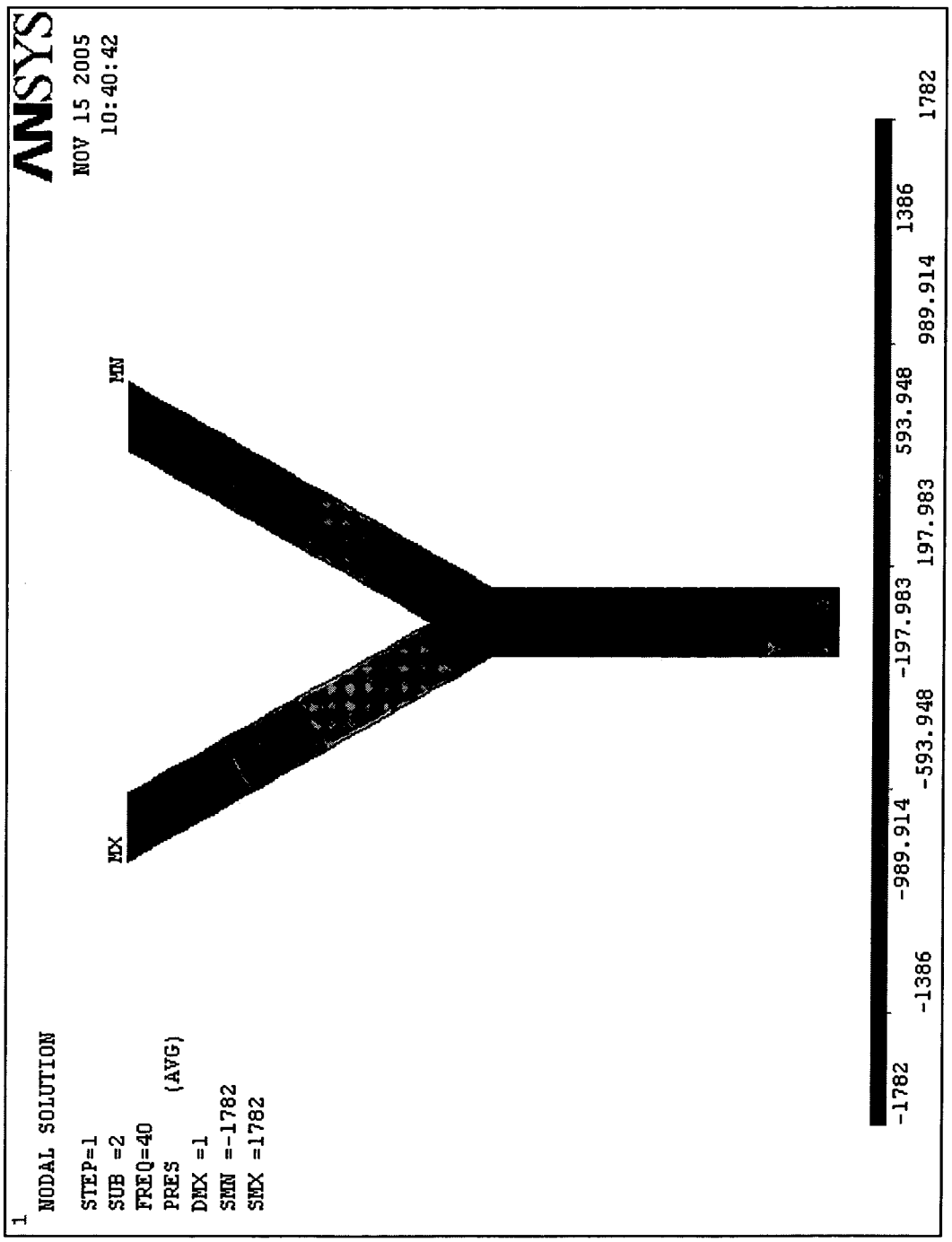
FIG. 8 is an illustration showing a different pipe configuration (Y-shaped), which is also successful in canceling pulsations, and showing that no pulsations are present in the piping after the blower conduits are merged.

Different pipe configurations were tested to observe the effect of pipe configuration on wave interference. Instead of the preferred L-shaped piping, straight piping coming from the blowers and forming a Y-shape after they merge were tested and yielded successful results as shown in FIG. 8. It is observed that as long as the piping is symmetric, any piping geometry will work to achieve wave cancellation.

Pressure pulsations start to develop at the discharge point of each blower and they only cancel after pulsations from both blowers interfere with each other. For this reason, the use of a Helmholtz resonator may be necessary to prevent the pressure pulsations from developing at the conduit of each blower before the conduits are merged at the junction point. Pulsations are particularly amplified as one of the acoustic resonance frequencies of the piping coincides with the blower frequency or its harmonics. Helmholtz resonators are very effective for canceling pressure pulses at certain frequencies. Placing one or more such resonators at the exit of each blower before merging the two pipes will eliminate any pulsations at specific frequencies before they are developed in these pipes to further reduce pressure pulsations. These one or more resonators may also be placed on the intake side of each blower. It is very crucial to place these resonators symmetrically so that they will not distract from active cancellation of the pressure pulses at the primary frequency generated by the blowers.

From a technical point of view, the most effective way of canceling pulsations and plant noise is to attenuate the pulsations at its source. The present invention utilizes the concept of active pulsation cancellation by interfering same-amplitude 180° out of phase waves immediately after they are generated. Active pulsation cancellation provided by twin blowers eliminates the most damaging low frequency pulsations at the blowers' primary frequency. From this point of view, active pulsation cancellation is always preferable over reactive and/or absorptive silencers as they are not as effective to attenuate low frequency pulsations. Furthermore, elimination of pulsations right after they are discharged from the blower means less stress on and more reliability of the plant piping and equipment.

In another embodiment of the invention, the conduits positioned on the intake side of the blowers are also symmetrical and merge into one merged conduit and may be used in combination with Helmholtz resonators and/or silencers.

Smaller blowers create pulses with smaller amplitudes as compared to pulses generated by a much larger blower, as pulse amplitude is directly related to blower size. From this point of view, using twin blowers generates smaller pulsations and are therefore less of a problem than a single large blower.

A typical VPSA plant is equipped with feed blower inlet and vacuum blower discharge silencers to eliminate unwanted noise and pulsation in the plant. As the plant size gets larger, the size and cost of such silencer increases as well. Sometimes a Helmholtz resonator is employed in addition to the silencer as the silencer by itself is insufficient to attenuate the high level of blower pulsations. This invention eliminates the need for costly large silencers. Gas separation processes using one or more beds can use this invention for either supplying feed gas to the beds or for evacuating the beds.

High gas pulsations are also an important concern for equipment reliability in gas separation plants. In the past, many failures were due to gas pulsations generated by blowers. A twin set of blowers will eliminate potentially damaging high gas pulsations and, as a result, will increase plant reliability.

This invention also eliminates the need for costly and custom-made large blowers. The twin blowers concept utilizes two relatively small and commercially available blowers to provide a large flow of air into the plant. The prohibitively expensive alternative to this approach is to custom build a blower that produces double the flow of each small blower. Besides being expensive, such large blowers produce very high pulsations, and silencing such pulsations becomes a costly and challenging task.

Although the invention has been described in detail with reference to certain preferred embodiments, those skilled in the art will recognize that these are other embodiments within the spirit and the scope of the claims.

What is claimed is:

1. A method of canceling pressure pulsations from operating blowers in a gas separation plant comprising:
   a) installing two identical blowers, each having an intake side and a discharge side;
   b) connecting the first blower to a first conduit and the second blower to a second conduit;
   c) positioning the first conduit and second conduit symmetrically;
   d) merging the first conduit with the second conduit into a single merged conduit; and
   e) synchronizing the first blower with the second blower, wherein the first blower generates pressure pulsations at a targeted frequency that are 180° out of phase with the pressure pulsations at the same targeted frequency generated by the second blower.

2. The method of claim 1, wherein the first blower is synchronized to the second blower by means of a timing belt, gears, chains or synchronized motors.

3. The method of claim 1, wherein the first conduit and the second conduit are on the discharge side of the blowers.

4. The method of claim 1, wherein the first conduit and the second conduit are on the intake side of the blowers.

5. The method of claim 1, wherein the first conduit and the second conduit are on both the intake side and the discharge side of the blowers.

6. The method of claim 1, wherein the targeted frequency is the primary frequency of the pressure pulsations generated by the blowers.

7. The method of claim 1, wherein the length of the first conduit and the length of the second conduit are not equal to any integer multiple of a quarter-wavelength of a targeted frequency or its higher harmonics.

8. The method of claim 6, wherein the first and second conduits are L-shaped.

9. The method of claim 6, wherein the first and second conduits are straight and merge with the merged conduit to form a Y-shape.

10. The method of claim 1, wherein each blower comprises two lobes.

11. The method of claim 10, wherein the lobes of the first blower are positioned 45° out of phase with the lobes of the second blower.

12. The method of claim 1, wherein each blower comprises three lobes.

13. The method of claim 12, wherein the lobes of the first blower are positioned 30° out of phase with the lobes of the second blower.

14. The method of claim 1, wherein one or more Helmholtz resonators is installed in the first and second conduits.

15. The method of claim 1, wherein the blowers are feed blowers.

16. The method of claim 1, wherein the blowers are vacuum blowers.

17. An adsorption gas separation system wherein feed gas is passed into one or more adsorbent beds and one or more components of the gas is adsorbed by the bed and then discharged from the bed through the use of positive displacement blowers, the system comprising:
  a) two identical blowers, each having an intake side and a discharge side;
  b) a first conduit connected to the first blower and a second conduit connected to the second blower, where the first conduit and second conduit are positioned symmetrically;
  c) a merged conduit into which the first conduit and the second conduit merge together; and
  d) a mechanism which synchronizes the first blower with the second blower, wherein the first blower generates pressure pulsations at a targeted frequency that are 180° out of phase with the pressure pulsations at the same targeted frequency generated by the second blower.

18. The system of claim 17, wherein the first blower is synchronized to the second blower by means of a timing belt, gears, chains or synchronized motors.

19. The system of claim 17, wherein the first conduit and the second conduit are on the discharge side of the blowers.

20. The system of claim 17, wherein the first conduit and the second conduit are on the intake side of the blowers.

21. The system of claim 17, wherein the first conduit and the second conduit are on both the intake side and the discharge side of the blowers.

22. The system of claim 17, wherein the targeted frequency is the primary frequency of the pressure pulsations generated by the blowers.

23. The system of claim 17, wherein the length of the first conduit and the length of the second conduit are not equal to any integer multiple of a quarter-wavelength of the targeted frequency or its higher harmonics.

24. The system of claim 23, wherein the first and second conduits are L-shaped.

25. The system of claim 23, wherein the first and second conduits are straight and merge with the merged conduit to form a Y-shape.

26. The system of claim 17, wherein each blower comprises two lobes.

27. The system of claim 26, wherein the lobes of the first blower are positioned 45° out of phase with the lobes of the second blower.

28. The system of claim 17, wherein each blower comprises three lobes.

29. The system of claim 28, wherein the lobes of the first blower are positioned 30° out of phase with the lobes of the second blower.

30. The system of claim 17, wherein one or more Helmholtz resonators is installed in the first and second conduits.

31. The system of claim 21, wherein one or more Helmholtz resonators is installed in the first and second conduits on both the intake side and the discharge side of each blower.

32. The system of claim 17, wherein the blowers are feed blowers.

33. The system of claim 17, wherein the blowers are vacuum blowers.

34. The system of claim 17, wherein the system further comprises using a discharge silencer on the discharge side of the blowers.

35. An apparatus for canceling pressure pulsations produced in a gas separation process wherein such apparatus simultaneously provides either feed gas or evacuates product gas, comprising:
  a) two identical blowers, each having an intake side and a discharge side;
  b) a first conduit connected to the first blower and a second conduit connected to the second blower, where the first conduit and second conduit are positioned symmetrically;
  c) a merged conduit into which the first conduit and the second conduit merge together; and
  d) a mechanism which synchronizes the first blower with the second blower, wherein the first blower generates pressure pulsations at a targeted frequency that are 180° out of phase with the pressure pulsations at the same targeted frequency generated by the second blower.

36. The apparatus of claim 35, wherein the first blower is connected to the second blower by means of a timing belt, gears, chains or synchronized motors.

37. The system of claim 35, wherein the first conduit and the second conduit are on the discharge side of the blowers.

38. The system of claim 35, wherein the first conduit and the second conduit are on the intake side of the blowers.

39. The system of claim 35, wherein the first conduit and the second conduit are on both the intake side and the discharge side of the blowers.

40. The apparatus of claim 35, wherein the targeted frequency is the primary frequency of the pressure pulsations generated by the blowers.

41. The apparatus of claim 35, wherein the length of the first conduit and the length of the second conduit are not equal to any integer multiple of a quarter-wavelength of the targeted frequency or its higher harmonics.

42. The apparatus of claim 41, wherein the first and second conduits are L-shaped.

43. The apparatus of claim 41, wherein the first and second conduits are straight and merge with the merged conduit to form a Y-shape.

44. The apparatus of claim 35, wherein each blower comprises two lobes.

45. The apparatus of claim 44, wherein the lobes of the first blower are positioned 45° out of phase with the lobes of the second blower.

46. The apparatus of claim 35, wherein each blower comprises three lobes.

47. The apparatus of claim 46, wherein the lobes of the first blower are positioned 30° out of phase with the lobes of the second blower.

48. The apparatus of claim 35, wherein one or more Helmholtz resonators is installed in the first and second conduits on either the intake side or the discharge side of each blower.

49. The apparatus of claim 35, wherein one or more Helmholtz resonators is installed in the first and second conduits on both the intake side and the discharge side of each blower.

50. The apparatus of claim 35, wherein the blowers are feed blowers.

51. The apparatus of claim 35, wherein the blowers are vacuum blowers.

52. The apparatus of claim 35, wherein the apparatus further comprises a discharge silencer on the discharge side of the blowers.

* * * * *